(12) United States Patent
Johns et al.

(10) Patent No.: US 9,205,391 B2
(45) Date of Patent: Dec. 8, 2015

(54) DEVICE FOR INJECTING GAS INTO THE TUBES OF A CHEMICAL REACTOR

(75) Inventors: Clifford L. Johns, Louisville, KY (US); Dennis McAndrews, Jeffersonville, IN (US); Munaf Chasmawala, Louisville, KY (US); Matthew Laughlin, Louisville, KY (US); Douglas Cornett, Louisville, KY (US)

(73) Assignee: Extundo Incorporated, Louisville, KY (US)

( * ) Notice: Subject to any disclaimer, the term of this patent is extended or adjusted under 35 U.S.C. 154(b) by 754 days.

(21) Appl. No.: 13/483,123

(22) Filed: May 30, 2012

(65) Prior Publication Data

US 2013/0160882 A1 Jun. 27, 2013

Related U.S. Application Data

(60) Provisional application No. 61/491,559, filed on May 31, 2011.

(51) Int. Cl.
   *B01J 8/00* (2006.01)
   *B01J 4/00* (2006.01)
   *B01J 8/06* (2006.01)

(52) U.S. Cl.
   CPC  *B01J 4/001* (2013.01); *B01J 4/002* (2013.01); *B01J 8/002* (2013.01); *B01J 8/0025* (2013.01); *B01J 8/06* (2013.01); *B01J 2208/00769* (2013.01); *B01J 2208/00884* (2013.01); *B01J 2219/182* (2013.01); *B01J 2219/185* (2013.01); *Y10T 137/6855* (2015.04)

(58) Field of Classification Search
   CPC .......... B01J 4/001; B01J 8/002; B01J 8/0025; B01J 2208/00769; B01J 2208/00884; B01J 2219/182; B01J 2219/185
   USPC ........................ 137/899; 248/661; 269/17, 56
   See application file for complete search history.

(56) References Cited

U.S. PATENT DOCUMENTS

| | | | |
|---|---|---|---|
| 5,863,034 A * | 1/1999 | Vauter | 269/51 |
| 6,694,802 B1 | 2/2004 | Comardo | |
| 6,725,706 B2 | 4/2004 | Johns | |
| 6,981,422 B1 * | 1/2006 | Comardo | 73/756 |
| 2008/0142045 A1 * | 6/2008 | Johns et al. | 134/18 |
| 2008/0302388 A1 * | 12/2008 | Johns et al. | 134/7 |
| 2010/0059137 A1 * | 3/2010 | Johns | 141/1 |

* cited by examiner

Primary Examiner — Kevin Murphy
(74) Attorney, Agent, or Firm — Camoriano and Associates (57) ABSTRACT

A device for injecting gas into a plurality of vertical tubes of a chemical reactor from the bottom. The present invention relates to a device for injecting gas into tubes in a chemical reactor, and more specifically for injecting gas into the bottom of the tubes. The gas may be injected for the purpose of pressure testing the tubes, for blowing out the tubes in order to clean them, or for other purposes.

4 Claims, 6 Drawing Sheets

DEVICE FOR INJECTING GAS INTO THE TUBES OF A CHEMICAL REACTOR

BACKGROUND

This application claims priority from U.S. Provisional Application Ser. No. 61/491,559 filed May 31, 2011.

The present invention relates to a device for injecting gas into tubes in a chemical reactor, and more specifically for injecting gas into the bottom of the tubes. The gas may be injected for the purpose of pressure testing the tubes, for blowing out the tubes in order to clean them, or for other purposes.

Many chemical reactors are essentially a large shell and tube heat exchanger vessel, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with 10 to 500 or more such tubes. In any of these reactor vessels, catalyst, typically in the form of pellets (and other types of pellets that are not catalyst), may be loaded into the reactor to facilitate the reaction. The pellets are replaced periodically.

It may be advantageous to inject gas into the tubes in order to do back-pressure testing of the catalyst-loaded tubes in the reactor to ascertain the adequacy of the loading procedure. It also may be advantageous to inject gas into the tubes in order to clean the tubes. In the prior art, the injection of gas typically is done from the top. It is difficult or impossible to use existing equipment to inject gas from the bottom, especially if there is more than one injector and gas is being injected into more than one reactor tube at a time.

SUMMARY

The present invention relates to a device for injecting gas into the tubes of a chemical reactor from the bottom.

DESCRIPTION

Figure 1:
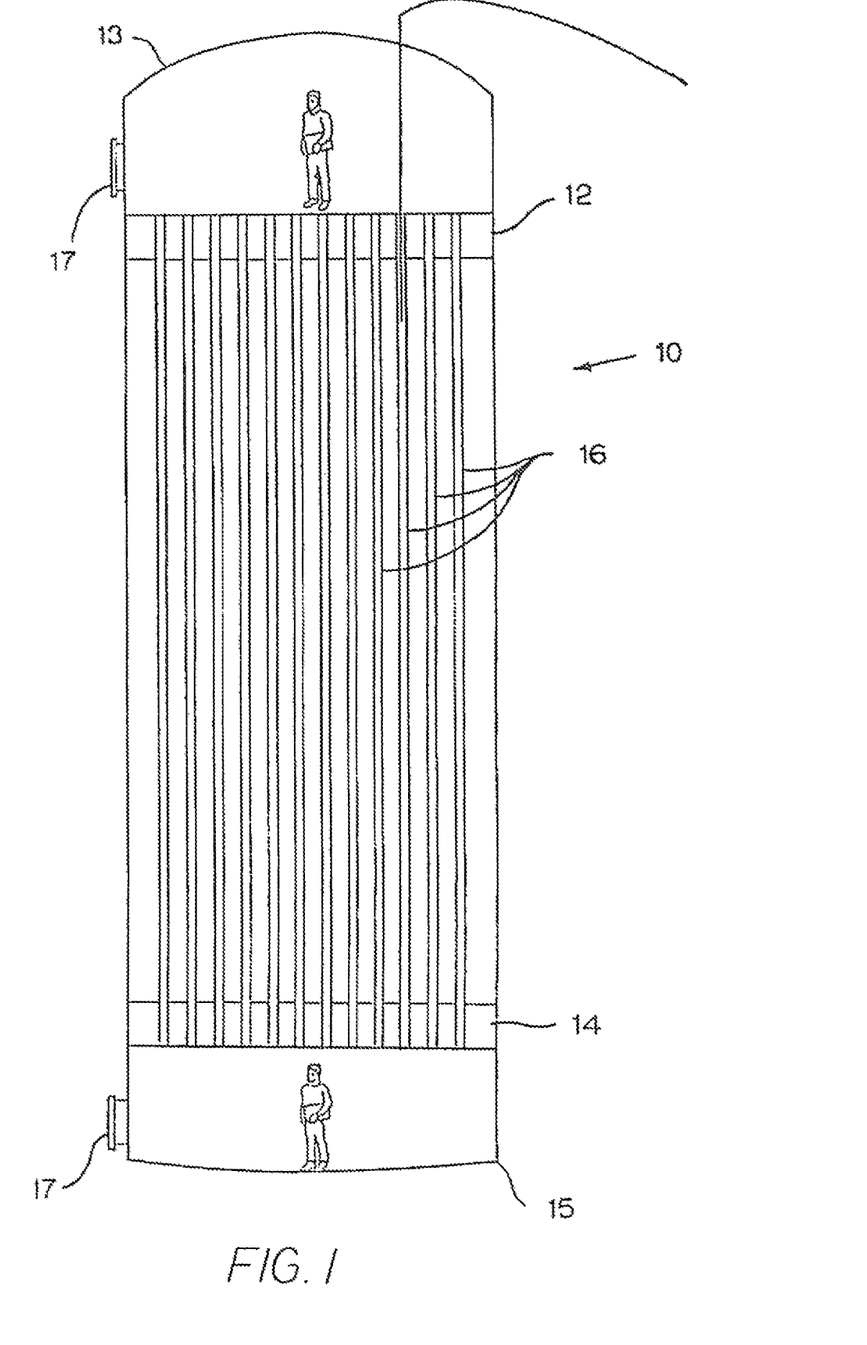
FIG. 1 is a schematic, section view of a shell and tube type of chemical reactor vessel.

FIG. 1 depicts a typical chemical reactor vessel 10, which is a shell and tube heat exchanger, having an upper tube sheet 12 and a lower tube sheet 14 with a plurality of vertical tubes 16 welded or expanded to the tube sheets 12, 14 to form a tightly packed tube bundle. There may be from one to many hundreds or even thousands of hollow, cylindrical tubes 16 extending between the tube sheets 12, 14. Each tube 16 has a top end adjacent the upper tube sheet 12 and a bottom end adjacent the lower tube sheet 14, and the tubes 16 are open at both ends, except that there may be a spring, clip or other device at the bottom end to prevent catalyst pellets from falling out the bottom of the tube. The upper and lower tube sheets 12, 14 have openings that are the size of the outside diameter of the tubes 16, with the outer surface of each tube 16 fitting tightly against the walls of the respective openings in the tube sheets 12, 14.

The vessel 10 includes a top head 13 and a bottom head 15, as well as manways 17 for access to the tube sheets 12, 14 inside the vessel 10. In some cases one or both heads 13, 15 are removable. The manways 17 are closed during operation of the reactor but are opened for access, such as during catalyst handling. In this instance, the tubes 16 are filled with catalyst pellets, which facilitate the chemical reaction. (It may be noted that similarly-shaped shell and tube heat exchangers may be used for other purposes, such as for a boiler or other heat exchanger)

This particular reactor vessel 10 is fairly typical. Its tubes may range in length from 5 feet to 65 feet, and it is surrounded by a structural steel skid or framework (not shown), which includes ladders, stairways or elevators for access to the tube sheet levels of the reactor vessel 10 as well as access to intermediate levels and to a topmost level which may be located at or near the level of the top opening of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done for research or on an emergency basis, on an unplanned and usually undesirable schedule.

A catalyst change operation involves a complete shutdown of the reactor, resulting in considerable cost due to lost production. It is desirable to minimize the amount of time required for the catalyst change operation in order to minimize the lost production and accompanying cost caused by the reactor shutdown.

It is desirable to blow gas through the tubes to clean them out and to blow gas through the tubes in order to back-pressure test the tubes 16 in the reactor vessel 10 to ascertain the adequacy of the catalyst loading procedure. Typically the injecting of gas is done from the upper head 13, using injectors which are inserted through the upper tubesheet 12 of the reactor vessel 10. For example, U.S. Pat. No. 6,725,706 "Johns et al", Device and Method for Blowing Down and Measuring the Back Pressure of Chemical Reactor Tubes, issued Apr. 27, 2004, which is hereby incorporated herein by reference, discloses a device and method for blowing down and measuring the back pressure in chemical reactor tubes and includes many automated features. Inflatable tube seals may be automatically inflated to seal between the injector tube and the reactor tubes. The device may measure several tubes at once. It may transmit data electronically to a remote computer for analysis and graphic display.

Figure 2:
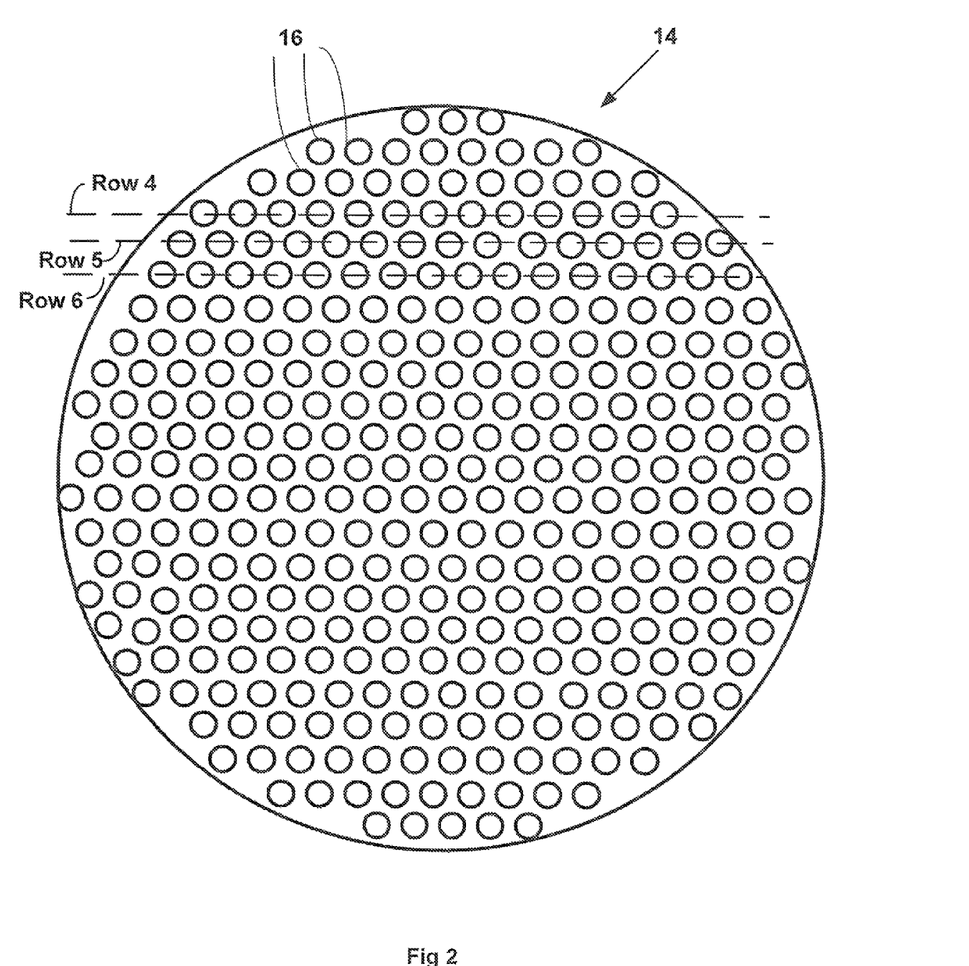
FIG. 2 is a bottom view of the lower tube sheet of the reactor of FIG. 1.
Figure 3:
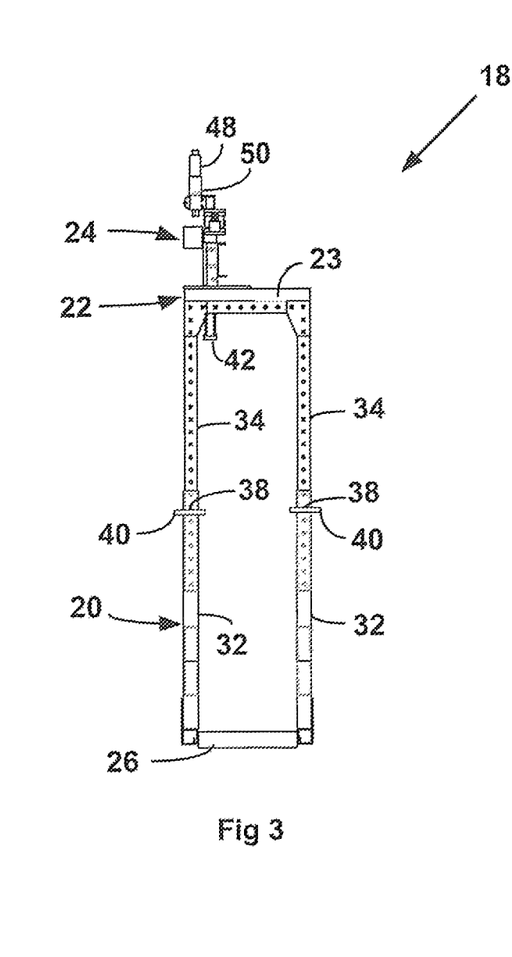
FIG. 3 is a side view of a bottom injector device.
Figure 4:
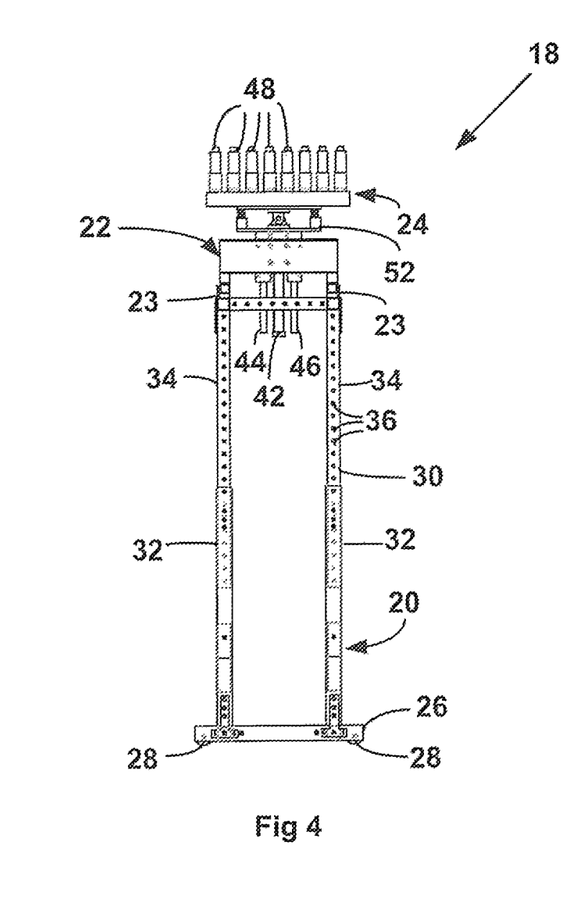
FIG. 4 is a front view of the bottom injector device of FIG. 3.

FIG. 2 is a schematic bottom view of the lower tube sheet 14 of FIG. 1, including a plurality of reactor tubes 16 (and is identical to the upper tube sheet 12). FIG. 3 is a side view of an example of a device 18 made in accordance with the present invention, and FIG. 4 is a front view of the same device 18. The device 18 includes a base 20, support frame 22 slidably supported on the base 20, and a tube test device 24 which includes a plurality of injector tubes 48 mounted on the support frame at fixed spacings relative to each other. The tube test device 24 is substantially identical in its operation and function to the tube test device disclosed in the aforementioned Johns Patent '706, as explained below. If it functions to measure the back pressure of the tubes, then it includes a pressure sensor to measure the back pressure when the gas is being injected through the injector tubes 48. If it functions to blow gas through the tubes in order to clean them out, then it does not have to include a pressure sensor.

Figure 5:
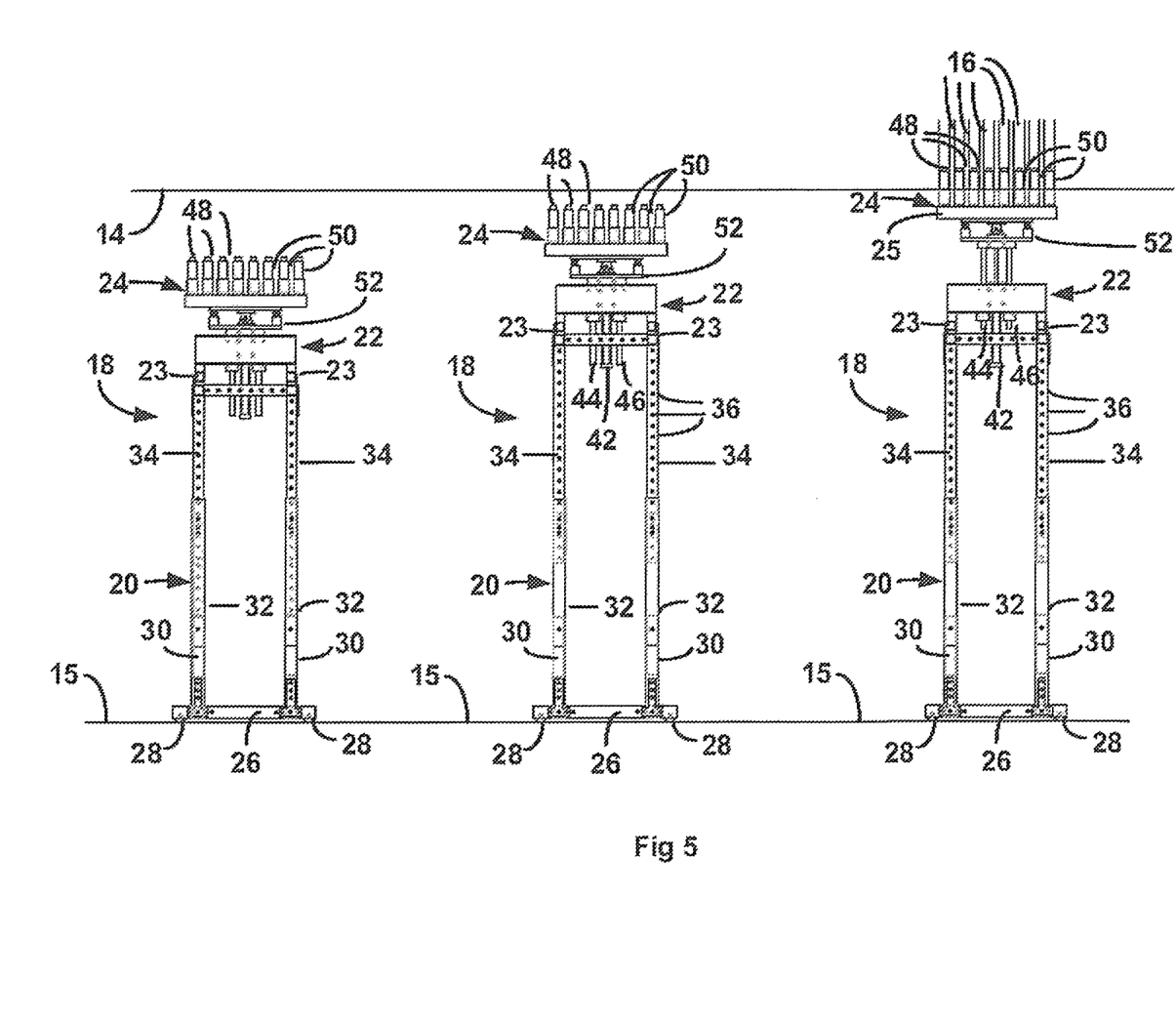
FIG. 5 is broken away view of the bottom portion of the reactor of FIG. 1, including three bottom injector devices in three different stages of height adjustment.

Referring to FIG. 4, the base 20 includes a rectangular bottom 26 supported on a plurality of rollers 28. The rollers 28 are cylindrical and are rotatably mounted parallel to each other on the base 20 with their axes of rotation 58 (See FIG. 9) fixed relative to the base 20, so they restrict the movement of the base 20 to linear movement, in the direction of the arrow 56 (see FIG. 8) along the floor of the bottom head 15 of the reactor. The rollers roll along the floor or bottom dome 15 of the reactor 10 or along a temporary deck or floor (not shown). Projecting upwardly from the rectangular bottom 26 and adjacent to the four corners of the rectangular bottom 26 are four legs 30. Each leg 30 includes a fixed lower leg portion 32 and a telescoping upper leg portion 34. The telescoping upper leg portions 34 define a plurality of through openings 36 at various elevations. These openings 36 may be aligned with corresponding horizontally aligned openings 38 (See FIG. 3) on the upper ends of the fixed lower legs 32. As may be appreciated in FIG. 3, pins 40 may be removed from the openings 38 in the fixed lower legs 32 to allow the vertical movement of the telescoping upper legs 34 so as to place the tube test head device 24 just below the bottom tube sheet 14, as shown in the middle of FIG. 5. Once the device 18 is height-adjusted such that the tube test head device 24 is just below the bottom tube sheet 14, the pins 40 are re-inserted through the openings 38 in the fixed lower leg portions 32 and through the aligned openings 36 in the telescoping upper leg portions 34 to lock the upper and lower leg portions 34, 32 against relative motion.

Figure 6:
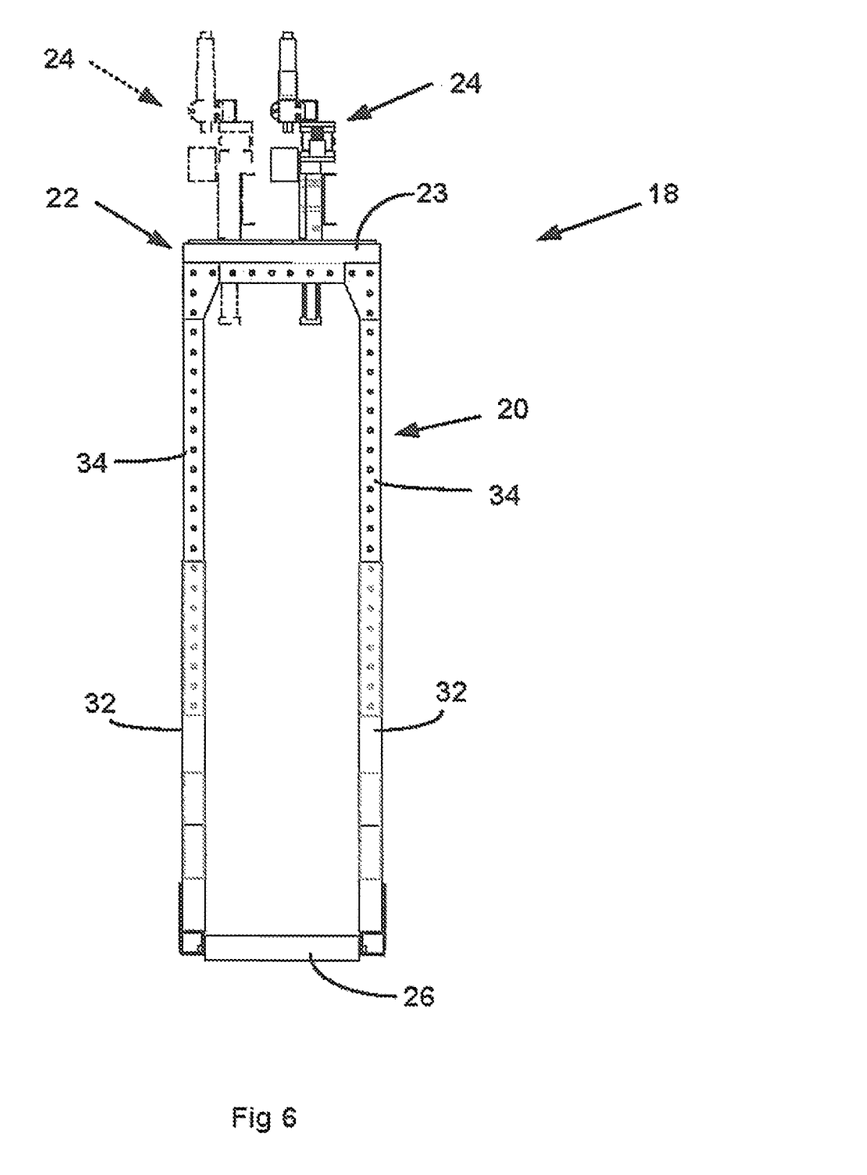
FIG. 6 is the same view as FIG. 3, but showing the injector head slid forward, with the initial, rearward location of the injector head shown in phantom.
Figures 7, 8, 9:
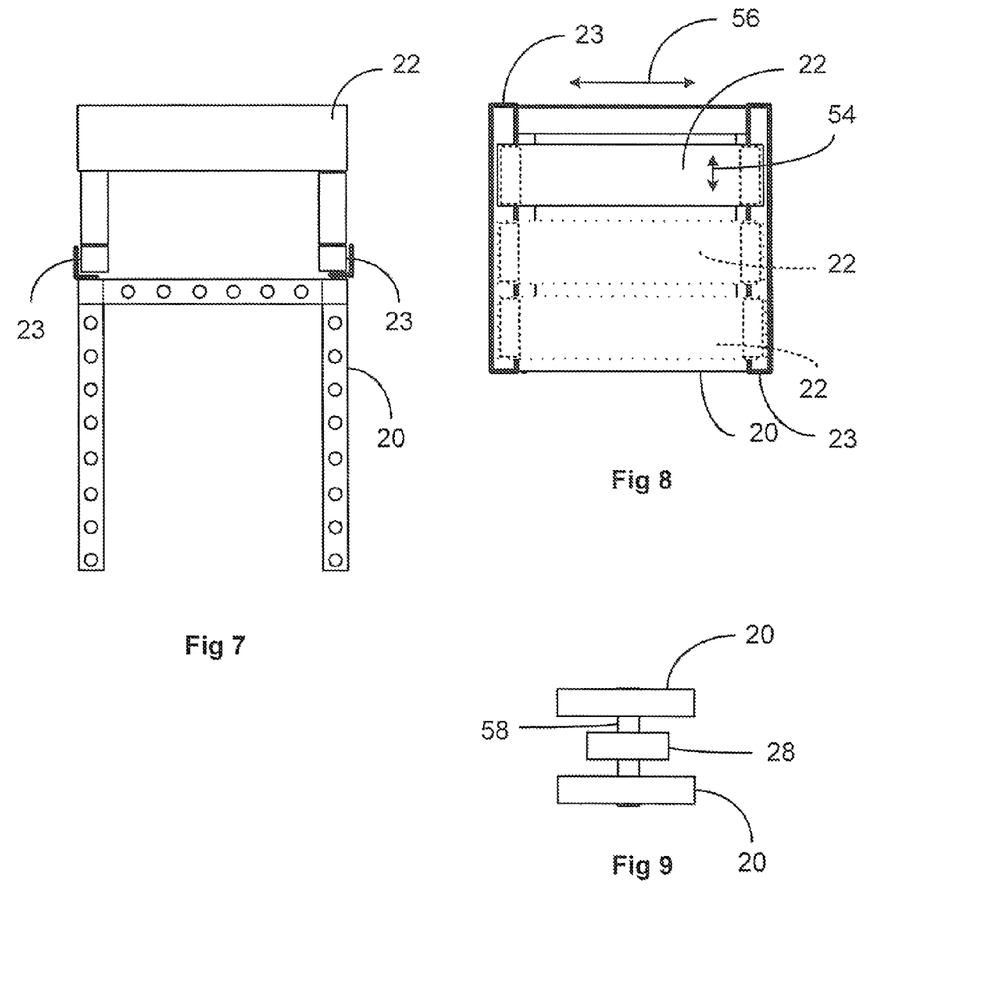
FIG. 7 is a detailed front view of a portion of the injector device of FIG. 4
FIG. 8 is a plan view of the portion of the device shown in FIG. 7.
FIG. 9 is a schematic of one of the rollers mounted on the base of the injector device of FIG. 4.

The support frame 22 rests atop, and is slidably supported by, the base 20. The support frame 22 is guided by rails 23 (See FIGS. 4, 7, and 8) to allow horizontal displacement of the support frame 22 (and of the tube test device 24 mounted to the support frame 22) relative to the base 20. FIG. 6 shows the support frame 22 and the tube test device 24 in phantom in a rearward position, and in solid in a more central position, forward of the position shown in phantom. FIG. 8 also shows the displacement of the support frame 22 in the direction of the arrow 54 relative to the base 20. The support frame 22 is shown in solid in a first, rearmost position and in phantom in two other positions, both of them forward of the first, rearmost position.

As explained in more detail later, when the support frame 22 moves forward and rearward along the rails 23 (in the direction of the arrow 54, see FIG. 8), it allows the injectors of the tube test device 24 to be shifted from one row of reactor tubes to the next row of reactor tubes (such as from row 4 to row 5 and then to row 6 in FIG. 2) which enables the device 18 to inject gas into more than one row of tubes without having to move the base 20.

The support frame 22 is a box which includes a pneumatic cylinder 42 and two guide rods 44, 46. (See FIG. 5.) A piston (not shown) inside the pneumatic cylinder 42 utilizes compressed air to raise and lower a platform 52 which supports the tube test device 24, as shown in the two rightmost, bottom tester tube test devices 18 of FIG. 5. The middle device 18 in FIG. 5 is in the retracted position, and the device 18 on the right of FIG. 5 is in the extended position. Also included in the support frame 22 are pushbutton controls to raise and lower the pneumatic cylinder 42 as well as limit switches to control how far up and down the pneumatic cylinder 42 moves upon initiation of the raising and lowering action with the pushbutton controls. Of course, the vertical motion could be hydraulically, electrically, or even manually (i.e. hand crank or lever) operated instead of (or in addition to) the pneumatic operation described above.

The rollers 28 define a support footprint for said base, and the injector tubes 48 of the tube test device 24 lie within an imaginary vertical column projecting upwardly from said support footprint, in order to avoid creating forces tending to tip over said base.

As described earlier, the tube test device 24 may be of any known type. In a preferred embodiment, the tube test device 24 is a device for providing blowdown and/or measuring the back pressure in chemical reactor tubes as disclosed in U.S. Pat. No. 6,725,706 "Johns et al", Device and Method for Blowing Down and Measuring the Back Pressure of Chemical Reactor Tubes, issued Apr. 27, 2004. The tube test device 24 is attached to the support frame 22 and is raised and lowered along with the support frame 22. The injector tubes 48 on the tube test device 24 are directed upwardly, and each injector tube 48 includes an inflatable tube seal 50 to lock and seal its corresponding injector tube 48 against the inner surface of a respective reactor tube 16.

To operate the device 18, it is first introduced into the bottom head 15 of the reactor vessel 10 through an open manway 17 (or through any other suitable opening). The device 18 is readily broken down into components to allow ease of introduction of those components through the limited access manway 17. For instance, the support frame 22 only rests on the base 20 as shown in FIG. 7 and can be lifted off of the base 20 in order to pass through the manway separately from the base 20. Also, the tube test device 24 is easily separated from the support frame 22 so it may be readily and individually ported through the manway 17.

Once in the bottom head 15, the device 18 is assembled as shown in the leftmost device 18 of FIG. 5. The base 20 is then adjusted, as shown in the middle device 18, such that the injector tubes 48 are just below the bottom tube sheet 14 and will clear the bottom tube sheet 14 as the device 18 is moved linearly along the bottom head 15.

Typically, the bottom tester tube test device 18 is aligned such that the rollers 28 allow movement of the base 20 (and therefore movement of the bottom tester tube test device 18) linearly, from left to right along a row of tubes 16 corresponding to the direction 56 in FIG. 8 (such as along Row 4 in FIG. 2). The support frame 22 preferably is mounted on the rails 23 (See FIG. 4) to allow movement of the tube test device 24 relative to the base 20 in a front-to-back direction (shown by the arrow 54, FIG. 8) which is substantially perpendicular to the direction of movement allowed by the rollers 28 (shown by the arrow 56, FIG. 8). That is, the support frame 22, and the tube test device 24 mounted on the support frame 22, are allowed to move by the guide rails 23 from one row to another, such as from row 4, to row 5, and then to row 6 (See FIG. 2).

The device 18 is moved until the injectors 48 are substantially lined up with the bottom openings of a set of tubes 16 in one row of the bottom tube sheet 14. The pushbutton on the support frame 22 is pressed to raise the support frame 22 such that the injectors 48 enter the bottom openings of the tubes 16. A limit switch is provided on the top surface of the plate 25 and is depressed when the plate 25 contacts the bottom surface of the bottom tube sheet 14. This tells the controller to stop the raising of the piston in the cylinder 42. It also tells the controller to inflate the tube seals 50, since the injector tubes 48 have been introduced into the reactor tubes 16 far enough that it is safe to allow the tube seals 50 to be inflated to seal against the inside of the tubes 16, as shown in the rightmost device 18 in FIG. 5. The testing sequence for the tube test device 24 (or the blowdown sequence) may then be initiated.

Once the sequence is completed and the seals 50 have deflated, the pushbutton on the support frame 22 is pressed by the operator to lower the support frame 22 such that the injector tubes 48 are retracted from and clear the bottom tube sheet 14. At this time, the device 18 is aligned with a row of tubes 16 (row 4, for instance, in FIG. 2). The device 18 is then pushed by the operator such that it is displaced linearly on its rollers 28 in the direction of the arrow 56, in the left-to-right direction, with the injector tubes 48 tracking left-to-right along the row of tubes. After moving the device 18 the desired distance (in this instance, moving the device 18 down the distance of eight reactor tubes in order to align the injector tubes 48 with the next adjacent set of 8 reactor tubes 16), the operator once again presses the pushbutton to raise the frame 22, and the process is repeated.

The raising action of the frame 22 proceeds slowly enough to allow the operator to better position the injector tubes 48 (by pushing the base 20 so its rollers 28 roll along the bottom head 15 or by sliding the support frame 22 relative to the base 20) as the support frame 22 is being raised. In one embodiment, the support frame 22 is raised only as long as the pushbutton control is depressed by the operator. Releasing the pushbutton control stops the raising action to allow the operator to ensure proper alignment of the injector tubes 48 of the test device 24 with a set of reactor tubes 16. Of course, once the upper limit switch is depressed and signals the controller (not shown) that the plate 25 is in contact with the bottom surface of the bottom tube sheet 14, the controller causes the cylinder to stop raising the support frame 22, even if the pushbutton is depressed.

Once the end of a row is reached, the support frame 22, together with the tube test device 24, may be moved in the front-to-back direction from a first position to a second position (such as from the position shown in phantom to the position shown in solid in FIG. 6) to line up the injector tubes 48 with an adjacent row (for instance, from row 4 to row 5 in FIG. 2) without having to move the base 20. When it is no longer possible to reach the next row of tubes 16 by relocating the support frame 22 on the base 20, the base 20 may be dragged in the front-to-back direction to the next set of rows of tubes.

Of course, instead of dragging the base 20 to the next set of rows of tubes, it could be possible to leave the seals 50 inflated inside the tubes 16 such that the test device 24 and the frame 22 are supported by the reactor tubes 16. The base 20 may then be pushed to shift it to the next set of rows of tubes, without moving the test device 24 and the frame 22. Once the base 20 has been shifted, the seals 50 may be deflated to allow the test device 24 and the frame 22 to be moved (relative to the base 20) to the next set of rows of tubes.

To summarize, the device 18 is first placed in a position to start testing tubes at the beginning of a row and with the tube test device 24 located in a first position as close to the front or rear side of the support frame 22 as possible (as shown in FIG. 3). Once the corresponding set of tubes 16 has been tested, the base 20 is pushed in the left-to-right direction along the row of tubes so as to test the next set of tubes 16 in the same row. This is repeated until all the tubes in the row have been tested. At the end of the row, the support frame 22 is slid in the front-to-back direction to a second position atop the base 20 to be able to reach the next, adjacent row of tubes. Once the corresponding set of tubes 16 in this new row has been tested, the base 20 is pushed back along the row in the left-to-right direction so as to test the next set of tubes 16 in this same new row. This is repeated until all the tubes in the new row have been tested and the device 18 is once again at an end of a row. Then the support frame 22 is slid in the front-to-back direction to a third position atop the base 20 to be able to reach the next adjacent row of tubes, and this procedure is repeated until it is no longer possible to reach the next, adjacent row by relocating the support frame 22 atop the base 20, at which time the base 20 is dragged over so that a new set of rows of tubes may be reached.

Of course, the above procedure may be altered without departing from the scope of the present invention. For example, the frame may be shifted to various front-to-back positions so that all (or most, or some) of the rows which are reachable from a given position of the base 20 may be tested before the base 20 is moved in the left-to-right direction to reach additional tubes for testing. (It still may be necessary to move the base 20 slightly in the left-to-right direction if the reactor tubes in the adjacent row are offset from each other in the left-to-right direction.) It will be obvious to those skilled in the art that modifications may be made to the embodiments described above without departing from the scope of the present invention.

What is claimed is:

1. A device for injecting gas into vertical reactor tubes in a chemical reactor, wherein each vertical reactor tube has an inside diameter and extends downwardly from a horizontal upper tube sheet to a horizontal lower tube sheet, and wherein there is a horizontal floor below the lower tube sheet, comprising:
   a base;
   a plurality of rollers mounted on said base so as to support said base on the horizontal floor and to allow said base to move along the horizontal floor;
   a set of telescoping legs extending upwardly from said base;
   a support frame supported on said telescoping legs and movable from a lowered position to a raised position;
   a plurality of upwardly directed injector tubes mounted on said support frame for injecting gas into reactor tubes located above said rollers, with fixed spacings between the injector tubes;
   wherein said support frame is mounted on a track which allows for restricted movement of said support frame along a front-to-back horizontal axis relative to said base; and
   wherein said rollers define a support footprint for said base, and the injector tubes of the tube test device lie within an imaginary vertical column projecting upwardly from said support footprint, in order to avoid creating forces tending to tip over said base.

2. A device for injecting gas into vertical reactor tubes in a chemical reactor as recited in claim 1, and further comprising a pneumatic cylinder mounted on said support frame for moving said support frame between the raised position and the lowered position.

3. A device for injecting gas into vertical reactor tubes in a chemical reactor as recited in claim 2, and further comprising controls mounted on said support frame which control the pneumatic cylinder, and a limit switch which stops the upward motion of said support frame as said support frame is moving upwardly.

4. A device for injecting gas into vertical reactor tubes in a chemical reactor as recited in claim 3, and further comprising inflatable seals on said injector tubes, and wherein said limit switch also controls the inflation of said inflatable seals.

* * * * *